May 17, 1949.  H. B. YOUNG  2,470,541

SLUSH PUMP PISTON

Filed June 2, 1947

INVENTOR.
HENRY B. YOUNG
BY Lester B. Clark
& Ray L. Smith
ATTORNEYS

Patented May 17, 1949

2,470,541

UNITED STATES PATENT OFFICE 2,470,541

SLUSH PUMP PISTON

Henry B. Young, Houston, Tex.

Application June 2, 1947, Serial No. 751,702

9 Claims. (Cl. 309—4)

This invention relates to the structure of a piston of the type particularly adapted for use in slush pumps where both high pressures and abrasive liquids are encountered.

It is an object of this invention to provide an improved structure for securing the sealing rubbers or packing to the body of the piston.

A further object of this invention is to provide a sealing rubber end plate which is an improvement over that disclosed in undersigned, prior Patent No. 2,402,268 of June 18, 1946.

Still a further object of this invention is to provide an end plate securing means wherein the axial force tending to displace it is taken up by principally rigid and inflexible portions of the end plate and not solely by a snap ring as disclosed in the above mentioned patent.

Still a further object of this invention is to provide an end plate securing means wherein a snap ring serves to hold the end plate in such position that substantially only the weight of the end plate is secured by the snap ring, and the end plate itself in cooperation with the piston body takes up the strain of holding the sealing rubbers in position on the piston body.

Yet a further object of this invention is to provide a tongue and groove means of cooperatively securing end plate halves or sections to a piston body to hold the sealing rubbers in position.

Other and further objects of this invention will be readily apparent when the following description is considered in connection with what is hereinafter claimed and the accompanying drawing wherein:

Figure 1:
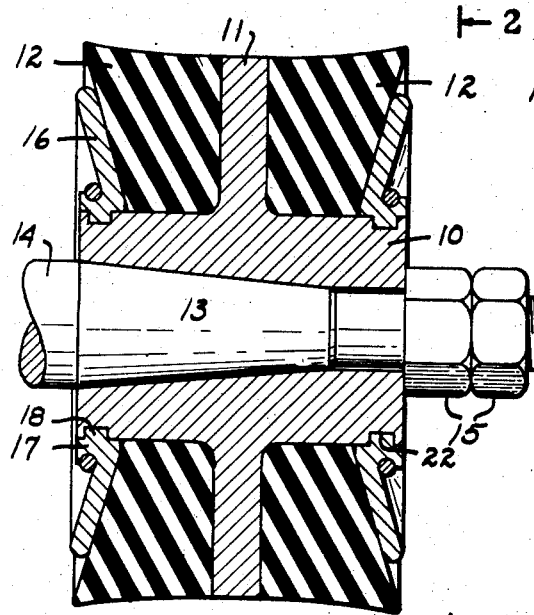
Fig. 1 is a sectional view of the piston assembled on the piston rod.
Figure 2:
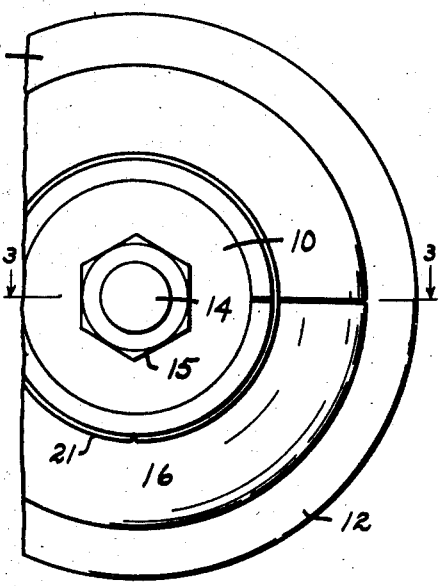
Fig. 2 is an end view on line 2—2 of Fig. 1.
Figure 3:
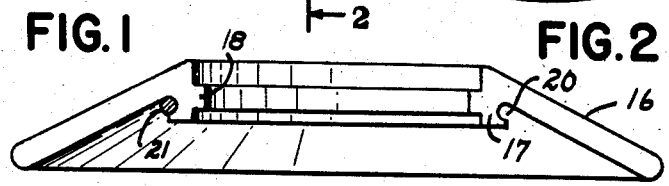
Fig. 3 is an edge view of an end plate section on line 3—3 of Fig. 2, on a slightly larger scale.
Figure 4:
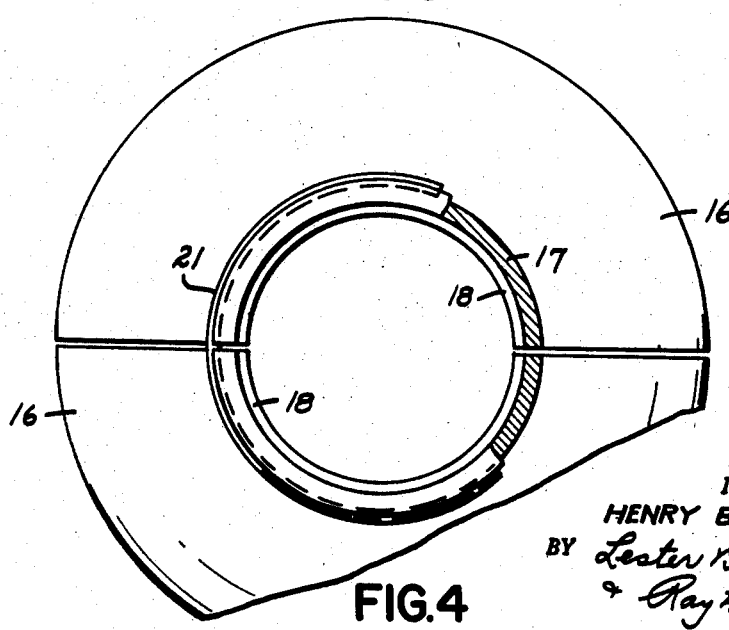
Fig. 4 is a partly fragmentary and partly section side view of the end plates, on about line 4—4 of Fig. 3.

The piston body 10 is of somewhat standard construction with the usual radial flange 11 against which are secured the sealing rubbers or packing 12 by the improved end plates and securing means of this invention, the piston body being conventionally mounted on the tapered neck 13 of the piston rod 14 by the usual nuts 15.

Instead of utilizing the conventional one piece dished end plates, this invention provides paired end plate halves or sections 16, so that there are four end plate halves or sections, all substantially identical, used in assembling one piston.

Each of the end plate sections 16 is dished as usual, but its inner edge is provided with an offset cylindrical portion at 17 having an inwardly extending tongue 18 and an outwardly extending counter sunk groove 20, the groove being of a shape and diameter to receive a snap ring 21 therein. The piston body 10 is provided with a pair of annular grooves 22 complementary in shape and size to the tongues 18 of the end plate sections 16.

In assembling, the sealing rubbers 12 are placed on the piston body 10 in the usual manner against the radial flange 11. Then a pair of the dished end plate sections 16 are radially fitted with their tongues 18 entering the groove 22 from opposite sides of the piston body. The snap ring 21 is next placed into the countersunk groove 20 of both plate sections 16, now lined up to form a continuous snap ring receiving groove. The same operation is repeated with the end plates for the rubber at the other end of the piston, thus completing the assembly. As thus assembled, the snap ring does little more than hold the weight of the end plate sections, and the strain of holding the rubbers in position on the piston body during operation under high stresses is performed principally by the cooperating tongues 18 and grooves 22, in the piston body, all of substantially strong and heavy non-flexible metal.

Broadly the invention comprehends a piston in which the end plates or packing securing structure is held in place primarily by rigid and inflexible portions thereof.

What is claimed is:

1. In a slush pump piston having a body on which a sealing packing is mounted, means for securing the sealing packing on the piston against displacement therefrom comprising a plurality of dished end plate sections, cooperating tongue and groove means on the piston body and the inner edges of said end plate sections, each end plate section having a snap ring receiving groove adapted to form a groove when the section is in assembled position on the piston body, and a snap ring placed in the thus formed groove.

2. In a slush pump piston having a body on which an annular sealing packing is mounted, means for securing the sealing packing on the piston against axial displacement therefrom comprising a pair of end plate annular sections, cooperating tongue and groove means on the piston body and the inner annular edges of said end plate sections, each end plate section having a snap ring receiving groove adapted to form a continuous groove when the section is in assembled position on the piston body, and a snap ring placed in the thus formed continuous groove.

3. In a slush pump piston having a body on which an annular sealing packing is mounted, means for securing the sealing packing on the piston against transverse displacement therefrom comprising a plurality of dished end plate annular sections, cooperating tongue and groove means on the piston body and the inner annular edges of said end plate sections, each end plate section having a snap ring receiving groove adapted to form a continuous groove when the section is in assembled position on the piston body, and a snap ring placed in the thus formed continuous groove.

4. In a slush pump piston having a body and radial flange against which a pair of annular sealing packings are mounted on the body, means for securing the packings against transverse displacement from the radial flange comprising a pair of dished end plate sections forming an annulus when assembled, an offset cylindrical portion on the inner annular edge of said sections, a snap ring receiving groove countersunk in the outer cylindrical surface of said offset and a tongue extending inwardly from said offset, the piston body having a pair of countersunk grooves complementary in shape and size to the offset tongues.

5. In a slush pump piston having a body and radial flange against which a pair of annular sealing packings are mounted on the body, means for securing the packings against displacement from the radial flange comprising a pair of end plate sections forming an annulus when assembled, an outwardly extending offset cylindrical portion on the inner annular edge of said sections, a snap ring receiving groove countersunk in the outer cylindrical surface of said offset, and a tongue extending inwardly from the inner surface of said offset, the piston having a pair of countersunk grooves complementary in shape and size to the offset tongues.

6. In a slush pump piston having a body and radial flange against which a pair of annular sealing packings are mounted on the body, means for securing the packings against axial displacement from the radial flange comprising a pair of end plate sections forming an annulus when assembled, an offset cylindrical portion on the inner annular edge of said sections, a snap ring receiving groove countersunk in the outer cylindrical surface of said offset, a tongue extending inwardly from said offset, the piston having a pair of countersunk grooves complementary in shape and size to the offset tongues, and a snap ring located in the continuous groove formed by radially inserting the tongues of a pair of plate sections in the piston groove to hold such plate sections in assembled position.

7. In a slush pump piston having a body and radial flange against which a pair of annular sealing packings are mounted on the body, means for securing the packings against displacement from the radial flange comprising a pair of dished end plate sections forming an annulus when assembled, an outwardly extending offset cylindrical portion on the inner annular edge of said sections, a snap ring receiving groove countersunk in the outer cylindrical surface of said offset, a tongue extending inwardly from the inner surface of said offset, the piston having a pair of countersunk grooves complementary in shape and size to the offset tongues, and a snap ring located in the annularly aligned groove formed by radially inserting the offset tongues of a plurality of plate sections in the piston groove to hold such plate sections in assembled position.

8. An end plate for securing sealing packing upon the body of a pump piston comprising, a pair of end plate sections adapted to form an annulus when assembled, and means on the inner edges of said end plate sections for engagement with complemental means on the body to form a tongue and groove connection, each end plate section having an annular groove segment to provide a continuous groove when the sections are assembled to receive a fastener element to hold the sections in assembled relation.

9. An end plate for securing sealing packing upon the body of a pump piston comprising, at least two end plate sections adapted to form an annulus when assembled, the inner edge of each of said sections comprising a substantially cylindrical portion and an inwardly extending tongue, and each of said sections also having an outwardly extending groove segment, said groove segments being adapted to form a continuous groove when the sections are assembled.

HENRY B. YOUNG.

REFERENCES CITED

The following references are of record in the file of this patent:

UNITED STATES PATENTS

| Number | Name | Date |
| --- | --- | --- |
| 2,216,353 | Park | Oct. 1, 1940 |
| 2,431,653 | Volpin | Nov. 25, 1947 |